(No Model.)
W. H. JOHNSON & A. H. ADCOCK.
CASTER.
No. 559,334. Patented Apr. 28, 1896.
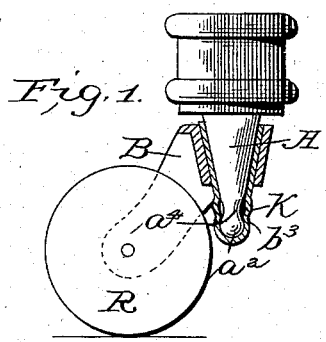
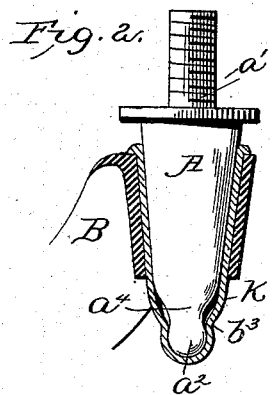

UNITED STATES PATENT OFFICE.

WILLIAM HENRY JOHNSON AND ARTHUR HUGH ADCOCK, OF BIRMINGHAM, ENGLAND, ASSIGNORS TO WILLIAM HENRY JOHNSON AND WILLIAM JAMES TAYLOR, OF SAME PLACE.

CASTER.

SPECIFICATION forming part of Letters Patent No. 559,334, dated April 28, 1896.

Application filed August 24, 1895. Serial No. 560,404. (No model.) Patented in England December 18, 1894. No. 24,557.

*To all whom it may concern:*

Be it known that we, WILLIAM HENRY JOHNSON, fitter, of back of 118 Tower Street, Birmingham, and ARTHUR HUGH ADCOCK, solicitor, of 21 Aston Lane, Birmingham, in the county of Warwick, England, and subjects of the Queen of Great Britain, have invented certain new and useful Improvements in Casters, of which the following is a specification.

The invention has been patented in England, No. 24,557, dated December 18, 1894.

It is the object of my invention to provide a simple and inexpensive form of caster which will allow the quick and easy attachment of the roller-frame to the caster-peg and which also will permit of a quick renewal of the bearing for the caster-peg when the same works loose due to wear.

In the drawings, Figure 1 is a part side and part sectional view of a caster attached to the leg. Fig. 2 is a view in section of the caster-socket with the peg in place.

The peg A is of conical form, with a depression at $a^4$ and a rounded bearing end. The roller R is of ordinary construction, and its frame B has a conical socket to receive the conical peg.

In order to provide a bearing for the peg which will permit the ready renewal of the same and also will permit the ready and secure attachment of the peg to the caster-frame, I provide a sheet-metal bushing K, of conical form, adapted to fit into the conical socket of the frame, and this bushing is flexible, and by simply pressing it in at $b^3$ it will fit into the groove $a^4$ of the peg, and thus the bushing will form the connection between the peg and the roller-frame.

What we claim, then, is—

In combination, the conical peg, having a depression about its lower end, a conical socket receiving said peg, and a conical bushing of sheet metal between the socket and the peg, the metal of the bushing being pressed into the depression of the peg, substantially as described.

In testimony that we claim the foregoing as our own we affix our names in the presence of two witnesses.

WILLIAM HENRY JOHNSON.
ARTHUR HUGH ADCOCK.

Witnesses:
REGINALD TREW MORGAN,
ALBERT NEWEY.